March 30, 1965 V. A. KOLESH ETAL 3,175,426
TOOL FOR INSTALLATION AND REMOVAL OF INSERTED PARTS
Filed April 4, 1962
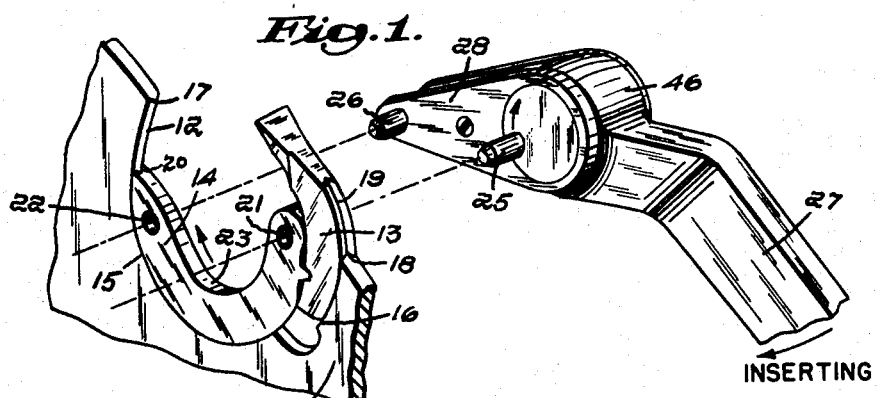
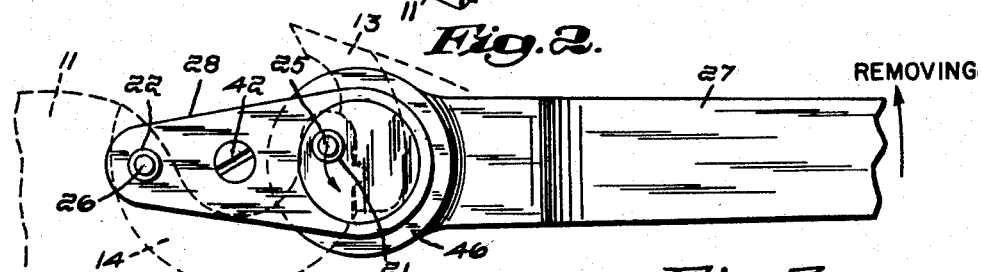
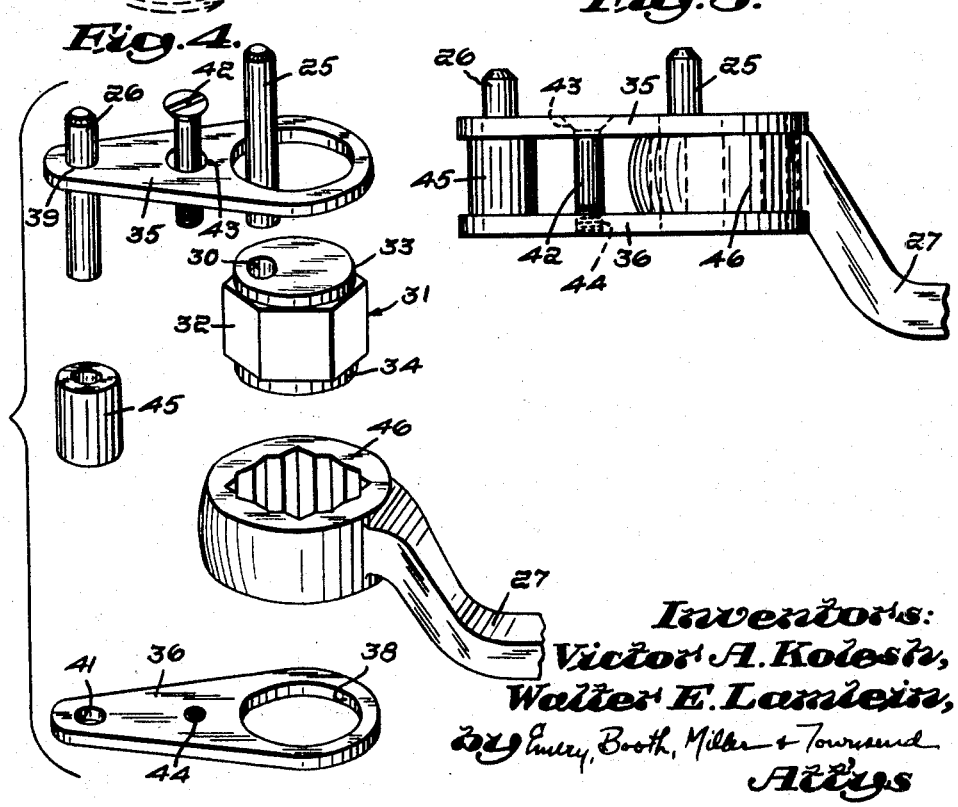
Inventors:
Victor A. Kolesh,
Walter E. Lamien,

United States Patent Office 3,175,426
Patented Mar. 30, 1965

3,175,426
TOOL FOR INSTALLATION AND REMOVAL OF INSERTED PARTS
Victor A. Kolesh, Holden, and Walter E. Lamlein, Leominster, Mass., assignors to Simonds Saw and Steel Company, Fitchburg, Mass., a corporation of Massachusetts
Filed Apr. 4, 1962, Ser. No. 185,163
2 Claims. (Cl. 76—80)

This invention relates to a tool especially adapted for use in the replacement of the tooth elements in saws of the inserted tooth type. More particularly, this invention relates to a tool having a pair of parallel upstanding relatively movable pin elements adapted to cooperate with tool-engaging apertures provided in the shank portions of said tooth elements and to advance toward each other under pressure applied to said tool during the insertion or removal of the tooth elements thereby compressing the shank portions and relieving the engaging forces between the shank portions and the saw.

Large circular saws of the type employed in the sawing of logs are frequently provided with replaceable tooth elements. In such instances, the saw plate or body is provided with a succession of generally semi-circular sockets along its periphery and each of the sockets is provided with a tooth element consisting generally of two parts, a cutter element known as a bit, and a holder element known as a shank. The purpose of this arrangement is to provide for the replacement of an individual tooth should that tooth become broken or dull, without the necessity of removing the entire saw body from the mill, a time-consuming operation especially when a number of saw bodies are mounted on a single shaft. The provision of replaceable inserted teeth generally facilitates operative maintenance in the field without necessitating shipment of saw plates to the maker for reconditioning.

In view of the high speed at which circular saws are operated and of the resulting high centrifugal forces produced along the periphery thereof, and in view of the sudden forces that may be imposed upon the cutter elements or bits in the presence of knots or of foreign objects such as, for example, rocks or spikes embedded in the timber, and in the instance of frozen logs, it is of the utmost importance that the replaceable tooth elements be firmly and accurately inserted in a saw body. This is normally accomplished by providing abuttive contact between the bit element and the saw body; by providing engaging or jamming contact between the bit element and the shank element; and by providing tight frictional contact between the shank element and the saw body.

The necessity for this firm and accurate insertion of the tooth elements has presented difficulties in the manipulation of the insert parts, particularly in the case of replacements in the field and has been the cause of undue wear of and damage to the insert parts and more importantly, to the saw body.

A major object of this invention is to provide a tool to facilitate manipulation of the insert parts, especially the holder shank, in such a manner as to reduce materially the stresses and frictional resistance to which they have heretofore been subjected during installation and removal. By the use of this tool, wear and other damage to the parts is reduced and broaching and abrading of the saw plate in the region of the sockets is obviated. At the same time, the use of this tool permits the use of a greater degree of locking friction and a more positive holding of the parts than has heretofore been possible. It even permits the use of knurled, serrated or other non-smooth locking surfaces.

In the drawings:

FIG. 1 is an exploded perspective view showing in cutaway a portion of the saw body with a shank element and bit element partially inserted and showing the shank manipulating tool in the inserting position;

FIG. 2 is a side view of the shank manipulating tool in its removing position showing in phantom section a bit element and a shank element in the assembled position in a saw body;

FIG. 3 is a top view of the shank manipulating tool; and

FIG. 4 is an exploded perspective view showing the elements of the shank manipulating tool.

Referring to the drawings, the left-hand portion of FIG. 1 represents a typical inserted saw-tooth assembly where the saw plate or body is represented at 11 and the saw-tooth assembly receiving socket at the periphery of plate 11 is represented at 12. Socket 12 is generally semi-circular in shape and is adapted to receive a pair of insert elements comprising a bit 13 and a holder or shank 14.

In the particular embodiment shown, the socket 12 comprises a shank-receiving portion 15 and a bit-receiving portion 16, said bit-receiving portion 16 having a common or closely adjacent center of origin but a greater radius than that of shank-receiving portion 15. Also, in the embodiment shown, both the shank-receiving portion 15 and the bit-receiving portion 16 are provided with an upstanding circumferential V-shaped rib shown at 17 and 18 respectively. Shank 14 and bit 13 are both provided on the surface adjacent the socket with an inwardly extending circumferential V-shaped groove adapted to cooperate with ribs 17 and 18. This groove is shown in the case of bit 13 at 19, and for the shanks one end of such groove appears at 20, FIG. 1. The function of the cooperating V-shaped ribs and groove is to provide greater frictional engagement between shank 14 and bit 13 on the one hand, and socket 12 on the other, and to prevent lateral displacement of the parts. The exact configuration of socket 12 and of insert part elements 13 and 14 are of no importance in the present invention and are shown merely to illustrate the operation of the invention.

Of importance to the present invention, however, is the provision in shank 14 of a pair of tool-engaging apertures or tool holders 21 and 22 located near the respective ends of the shank and lying upon or near a diameter of the shank passing through the center of origin of the outer or socket-engaging surface of the shank and of a generally concave inner margin 23 of arcuate contour spaced inwardly from the exterior margin of shank 14 to define an unoccupied gullet portion for receiving and discharging the shavings, chips and sawdust resulting from the sawing operation.

In a shank of the type described in detail in our aforesaid copending application, the provision of tool-engaging apertures 21 and 22 in the extremities of the shank and substantially upon the diameter passing through the center of origin provides the shank with the capacity to accept compressive forces substantially in line with said diameter. The application of such forces has a maximum effect in resiliently compressing or springing the shank legs or end portions in the direction toward each other, thus compressing the shank to a lesser diameter and thereby relieving the frictional binding or positive holding between the outer walls of shank 14 and the inner walls of socket 12 as exemplified by V-rib 17 and the corresponding V-groove 20 on shank 14. Hence, while subjected to such a compressive force, shank 14 is enabled to turn relatively freely within socket 12. As a result, the operation of inserting or removing the shank element and the bit element is greatly facilitated and the damaging effects of broaching and galling at the sliding and abutting surfaces are largely overcome. Such broaching and galling are particularly objectionable in view of the possibility of permanent damage to the relatively expensive saw body. At the same time, the increased ability of the shank to turn within the socket when subjected to such a compressive force permits the provision of a much greater locking force between the shank and the socket in the absence of the compressive force than has heretofore been possible.

The present invention relates particularly to a tool especially adapted to cooperate with tool-engaging apertures 21 and 22 and to apply the necessary compressive force during the insertion and removal of the shank.

The essential elements of this tool consist of two substantially parallel upstanding pins 25 and 26 adapted to be inserted into and to cooperate with tool-receiving apertures 21 and 22 and a handle 27. Pin 25 is mounted on handle 27 and pin 26 is mounted on an arm indicated generally at 28, which arm is rotatably mounted on said handle. Arm 28 is so mounted on handle 27 that its axis of rotation is in the vicinity of but offset from or eccentric to pin 25. The length of arm 28 is so selected and pin 26 is so mounted on arm 28 that the center-to-center distance between pins 25 and 26 at the position of closest approach between the two pins is substantially less than the center-to-center distance between apertures 21 and 22 and the center-to-center distance between the pins at the position of furthest separation is substantially more than the center-to-center distance between the apertures. Thus, as arm 28 is rotated relative to handle 27, the center-to-center distance between the pins varies and becomes equal to the distance between the apertures at some intermediate position of arm 28 relative to handle 27.

In use, when fixed pin 25 is inserted into one of the apertures 21 and 22 and relatively movable pin 26 is inserted into the other of said apertures, generally crescent-shaped shank 14 becomes a bridge between pins 25 and 26 and thereby locks handle 27 in a fixed position relative to movable pin 26 and arm 28. Because of the geometry of the combination as defined above, pins 25 and 26, when so inserted, are separated by a distance somewhat greater than the distance of closest approach between the two aforesaid pins. It should be noted that because of the geometry, there are two handle positions relative to the position of the arm wherein the pins are separated by a distance equal to the distance between the apertures. In one of these, a pressure applied in a given direction on handle 27 will tend to rotate said handle relative to arm 28 in such a manner that pins 25 and 26 will approach each other and in the other, pressure in the opposite direction on the handle will cause the pins to approach each other.

These two positions are illustrated in FIGS. 1 and 2 respectively. In FIG. 1 where the center of the pin 25 lies below a line drawn through the center of pin 26 and the center of rotation of arm 28, a downward pressure on the end of handle 27, in the arrow direction on FIG. 1, will tend to move pins 25 and 26 closer together. On the other hand, in FIG. 2 where the center of pin 25 lies above, a line drawn through the center of pin 26 and the center of rotation of arm 28, an upward pressure on the end of handle 27 will tend to force pins 25 and 26 closer together. Quite obviously, an upward pressure on handle 27 in the case of FIG. 1 and a downward pressure on handle 27 in the case of FIG. 2 will tend to cause the pins to spread apart.

When the tool is inserted into the tool-receiving apertures so that pressure in the desired direction applied on the end of handle 27 will tend to cause pins 25 and 26 to approach each other, resistance to the rotation of shank 14 in socket 12 will result in an increased force being applied to handle 27. The increased pressure or force applied to handle 27 will tend to move pins 25 and 26 closer together thereby imposing a compressive or springing force on shank 14. As explained above, this increased springing or compressive force will tend to reduce the effective outer diameter of shank 14 and will thereby relieve the binding forces between the outer diameter of shank 14 and socket 15.

Because of the arrangement of the tool, the compressive force applied to the shank is proportional, in every instance where the tool is oriented properly, to the binding forces between the shank and the socket. This is in contrast to certain two-pin spanner wrenches used in the past for the purpose of inserting and removing shanks in removable tooth saws where the distance between the pins was fixed and the wrench therefore could apply only a turning force without applying any compressive force.

In the particular embodiment shown in the drawings, specifically in FIGS. 3 and 4, handle 27 is a conventional box wrench. Such a wrench intended for use with a $^{15}\!/_{16}$ in. hexagonal nut is quite adequate for ordinary use. Pin 25 is mounted in hole 30 provided in holder 31. Holder 31 has a center section 32 having the shape and dimension of the nut with which the box wrench comprising handle 27 is intended to be used. In the specific embodiment, center section 32 has the shape and outer dimension of a $^{15}\!/_{16}$ in. nut.

Each end of holder 31 is provided with an integral cylindrical collar 33 and 34. These collars are each normal to and centered on the axis of holder 31. Pin 25 is press fitted in hole 30 which hole is drilled parallel to, but offset from, the axis of holder 31.

In the embodiment shown, arm 28 consists of two plates—top plate 35 and bottom plate 36. Each plate has at one end a circular opening 37, 38 adapted to fit over and cooperate with collar 33 and 34 respectively and to rotate therearound. At the other end of each plate 35 and 36, there is provided a circular opening 39 and 41, respectively, each adapted to receive pin 26. For convenience in assembly, opening 39 in top plate 35 provides a press fit with pin 26 and opening 41 in bottom plate 36 a loose fit. The two plates 35 and 36 are held together by a screw 42 which passes through a countersunk hole 43 in top plate 35 and fastens to a threaded hole 44 in bottom plate 36. The two plates are held apart at the pin end by collar 45 which is adapted to pass over and surround pin 26. To provide for the easy rotation of arm 28, the height of collar 45 and of center section 32 of holder 31 are equal and the top and bottom surfaces of the box or nut-receiving portion 46 of handle 27 are flat ground to the same height. The height or thickness of each of collars 33 and 34 is substantially equal to the thickness of plates 35 and 36 and the diameter of each of said collars is lesser than the diameter of the circle passing through the points of intersection of the sides of the center portion 32 of holder 31.

In the specific embodiment, the height of collar 45, of center section 32 and the distance between top and bottom surfaces of box portion 46 is each approximately 0.6 inch. Pins 25 and 26 are formed from ¼ in. hardened steel dowels. To facilitate insertion, pin 25 protrudes $^{7}\!/_{16}$ in. above the top of top plate 35 so that pin 25 may be inserted into the appropriate aperture first to steady the tool. The top portion of both pins is beveled to provide for easier insertion. Plates 35 and 36 are formed from $^{5}\!/_{32}$ in. steel plate. The center-to-center distance of closest approach between pins 25 and 26 is 1.47 in. and the center of pin 25 is offset from the axis of holder 31 by 0.31 in. The diametrical distance between the centers of apertures 21 and 22 of the particular shank for which a tool having the dimensions set forth above was designed is approximately 1.72 in. These dimensions are provided merely by way of illustration and are in no way intended to limit the scope of the invention.

It will be apparent that in the operation of the tool the handle 27 with its box portion 46 is angularly fixed about and relative to the holder 31 of pin 25. Therefore, if but a single position for the longitudinal axis of the handle 27 is desired or found convenient, relative to the radial crank or leverage line joining the center of pin 25 and the center of the holder 31, then said holder 31 may be formed integrally with the handle 27. However, it is found especially advantageous to construct the holder such as element 31 hereof as a separate and angularly adjustable part relative to the handle 27. This enables the tool to be preliminarily adjusted to suit the best convenience and preference of the individual sawyer or saw filer in effecting saw tooth installation or replacement.

Some filers prefer to work with their arm and tool hand above the saw socket at which tool removal or insertion is being accomplished, the force in one or the opposite direction for removal or insertion of the saw tooth parts then being exerted by push up or pull down motions as the case may be. For this position the tool handle should stand along an upwardly directed line relative to the tooth shank engaging arm 28 of the tool. Conversely, other filers prefer to work with the tool at a lower level, somewhat as in FIG. 1, so as to facilitate force exertion by motions of push down and pull up, and for which the tool handle should be along a substantially horizontal or downwardly directed line.

By constructing the holder 31 to be separable from and adjustable with respect to the handle 27, with provisions such as the non-round inner wall of the handle box portion 46 for receiving the hexagonal or other conforming non-round center section 32 of the holder 31 in different fixed positions of angular adjustment, the handle may be set to any selected angular alignment relative to said leverage line of the eccentric pin 25, over a substantial angular range such as 180° or more as circumstances or the saw filer's preference may dictate. Such adjustment is readily accomplished in the illustrated example by removing screw 42 and the arm plates 36, 37, sliding the holder 31 from the handle box 46, and then replacing said parts after turning the holder to the desired angular position in and with respect to the box portion of the handle.

Our invention is not limited to the particular embodiment thereof illustrated and described herein, and we set forth its scope in our following claims.

We claim:

1. A wrench-type tool for operative insertion and removal of cutter elements with respect to arcuate sockets of saw plates of the inserted-tooth type and which elements comprise tooth bits and crescentic holder shanks the legs of which have tool-engaging apertures near the respective outer ends and in substantial alignment upon a diameter of the shank with capacity for approach toward each other under compression of the shank along such diameter, said tool comprising an elongated handle having a grasping end and a work end, a nut-like holder carried at the work end of said handle and having a laterally upstanding first pin mounted thereon, an arm having one end portion mounted on the handle for pivoting relative thereto about an axis adjacent and parallel to said first pin but offset therefrom, said arm having an opposite free end portion, and a laterally upstanding second pin on said free end portion of said arm parallel to said first pin and to said arm pivot axis, said pins adapted for positioning in the apertures of a holder shank to be inserted in or removed from an arcuate socket therefor in a saw plate with both pins upon that side of the pivotal arm axis remote from the grasping end of the tool handle and with said first pin offset to one side of a line between the arm pivot axis and said second pin, and whereby with the pins so positioned torque applied to the grasping end of the tool handle for turning the shank in a socket of a saw plate in the inserting or removing direction as desired simultaneously applies compressive pressure across the shank legs for approaching them toward each other for relieving frictional bearing thereof against the socket margin by effective relative turning between the tool handle and said pivotal arm thereon in the direction to the shift said first pin toward said line between the arm pivot axis and said second pin and thereby causing approach of said pins toward each other, the work end of the handle having a non-round recess paralleling said first pin, and said nut-like holder being comformant to and non-rotatively but angularly adjustably received in said handle recess whereby the longitudinal axis of the handle may be adjusted with respect to the radial line between said first pin and the pivot axis of said second-pin-carrying arm.

2. The tool of claim 1, wherein said holder is provided with a cylindrical section concentric with the pivot axis of said second-pin-carrying arm and extending at opposite sides of the handle, and said second-pin-carrying arm consists of a pair of plates each having at one end thereof a circular opening adapted to fit over and cooperate with said cylindrical portion of said holder and means at the other end for mounting said second pin.

References Cited by the Examiner
UNITED STATES PATENTS

| | | | |
|---|---|---|---|
| 402,400 | 4/89 | Cook | 76—80 |
| 892,228 | 6/08 | Damon | 76—80 |
| 1,672,458 | 6/28 | Horner | 76—80 |
| 2,669,886 | 2/54 | Haughy | 76—80 |
| 2,748,626 | 6/56 | Daugherty | 76—80 |

GRANVILLE Y. CUSTER, Jr., *Primary Examiner.*

FRANK H. BRONAUGH, *Examiner.*